United States Patent [19]
Fujii et al.

[11] Patent Number: 5,488,498
[45] Date of Patent: Jan. 30, 1996

[54] LIQUID CRYSTAL DISPLAY WITH PARTICULAR CONTACTS FOR SUPPLYING COUNTER ELECTRODE POTENTIAL

[75] Inventors: Yoshiharu Fujii, Sagamihara; Toshihiko Yoshida, Yokohama, both of Japan

[73] Assignee: International Business Machines Corporation, Armonk, N.Y.

[21] Appl. No.: 216,865

[22] Filed: Mar. 23, 1994

[30] Foreign Application Priority Data

Mar. 23, 1993 [JP] Japan ................................ 5-063847

[51] Int. Cl.⁶ .................................................. G02F 1/1343
[52] U.S. Cl. .................................................. 359/88; 359/87
[58] Field of Search ........................................ 359/88, 87

[56] References Cited

U.S. PATENT DOCUMENTS 4,457,589  7/1984  Tamura et al. .................... 359/81
5,311,342  5/1994  Watanabe ......................... 359/88

FOREIGN PATENT DOCUMENTS 57-52027  3/1982  Japan ............................. 359/88
5-173167  7/1993  Japan ............................. 359/88

*Primary Examiner*—William L. Sikes
*Assistant Examiner*—Charles Miller
*Attorney, Agent, or Firm*—Ronald L. Drumheller

[57] ABSTRACT

A high definition, high quality active matrix type liquid crystal display is provided by excluding electrodes from a single side of two transparent substrates to reduce extra space, and providing only transfers in the remaining space. On the side of liquid crystal inlet 14, similarly as on other sides, a plurality of transfers 19 is provided outside seal 24. From transfers 19 on the side of liquid crystal inlet 14, a wiring pattern is formed inwardly, intersecting seal 24, to connect to extended conductor 21 formed in parallel with seal 24. Extended conductor 21 is led toward the side where signal line lead electrode 18 is provided, again crossing seal 24 to be connected with transfer lead electrode 20 formed on that side.

9 Claims, 5 Drawing Sheets

LIQUID CRYSTAL DISPLAY WITH PARTICULAR CONTACTS FOR SUPPLYING COUNTER ELECTRODE POTENTIAL

BACKGROUND OF THE INVENTION

1. Field of the Invention

The present invention generally relates to liquid crystal displays and more particularly to the arrangement of transfers or electrical contacts for supplying counter electrode potential to opposing transparent substrates of a liquid crystal display.

2. Description of Related Art

A liquid crystal display has two transparent substrates. Sealed between the transparent substrates are transparent electrodes, oriented films, nonlinear elements and liquid crystal material. Voltage is applied across the electrodes on the two transparent substrates to create an image.

In recent years, the mainstream in large liquid crystal displays has been the active matrix type, which uses a nonlinear element for each pixel. Large scale integrated circuits are used for driving signal lines in the active matrix type liquid crystal display (AM-LCD) and now have an output voltage that has been reduced to about 5 volts in order to increase the driving frequency and to lower the cost of the LSI chips. To use these 5 V LSIs, the AM-LCD driving method has also been changed from one which basically locks counter electrode potential (Vcom) to a certain reference potential to another which modulates counter electrode potential in response to the timing of output signals.

For the method of modulating counter electrode potential (Vcom), it is necessary to transfer the modulation signal for the transparent counter electrode with as short a time delay as possible. It is difficult to reduce the electrical specific resistance of the transparent counter electrode, formed of transparent conductor film such as ITO, in its forming process. Therefore, an increasing number of AM-LCDs have been employing a multi-transfer structure with an increased number of transfers, which has conventionally been provided only on the four corners of the LCD substrate, for electrically connecting the counter electrode substrate to the active matrix substrate, thus reducing effective time delay. This multiple transfer structure is particularly useful in large high definition liquid crystal displays.

FIG. 1 is a top view of an active matrix type liquid crystal display (AM-LCD) employing a conventional multi-transfer structure. In many applications, signal lines 17 are drawn alternately upward and downward to connect to the TABs (not shown) on which a signal line driving LSI is mounted, via signal line lead electrodes 18, in order to provide a vertically striped RGB arrangement. Scan lines 15 have a larger wiring pitch than that of signal lines 17, so they are led towards a single side (leftward in FIG. 1) to connect to the TABs (not shown) on which a scan line driving LSI is mounted, via scan line lead electrodes 16. On the other side (right), an opening is provided through seal 24 that serves as a liquid crystal inlet 14. Active matrix substrate 11 and counter electrode substrate 12 have been scribed with their end positions aligned.

The structure with the end positions of two transparent substrates aligned on the side of liquid crystal inlet 14 produces the significant advantages of reducing the panel size and eliminating extra materials. In addition, the structure ensures many other advantages, such as higher yield in glass scribing in the liquid crystal cell assembly process, reduced cost due to decreased amount of liquid crystal used in the liquid crystal feeding process, and improvements in yield and ability in the sealing process for the liquid crystal inlet using UV-hardened resin after liquid crystal feeding. In this structure, multiple transfers are located in each boundary of the TAB bundled to meet the number of outputs for both scan line and signal line sides, and in many applications, are provided counter electrode potential (Vcom) from peripheral circuit substrates via TAB through lines. On the other hand, the liquid crystal inlet side, which is scribed with the end positions of the two transparent substrates aligned., must have the portion of the transparent substrates which extends beyond the liquid crystal seal be small enough to obtain the above benefits. This limitation in space prevents transfers from being used on the side having the liquid crystal inlet. Thus, it has not been possible to apply counter electrode potential at the liquid crystal inlet side. This in turn has made it difficult to maintain uniform counter electrode potential across the display surface, resulting in detrimental effect upon display quality. This degradation in display quality is worse in liquid crystal displays with a large display area.

To form a number of transfers on the liquid crystal inlet side, in order to supply counter electrode potential (Vcom) at the liquid crystal inlet side, it is possible to extend the transparent substrate beyond the liquid crystal seal to provide sufficient space to form an electrode pattern similar to the pattern on the other sides, and connect wiring from external peripheral circuit substrates to this pattern. However, this would preclude the many advantages described above.

SUMMARY OF THE INVENTION

It is therefore an object: of the present invention to reduce the distance between the seal portion of two transparent substrates for liquid crystal displays and their end face, thus decreasing the size of the display itself, and to provide a plurality of transfers also for the sides without various electrodes, in order to obtain a high definition liquid crystal display with improved display quality, and specifically, to provide a structure in which a plurality of transfers are accommodated without electrodes being formed on the liquid crystal inlet side.

It is another object of the invention to provide an optimum structure for obtaining high quality, high definition images in active matrix type liquid crystal displays having a large display area.

It is yet another object of the invention to provide a liquid crystal display which allows for higher yield in glass scribing in the liquid crystal cell assembly process, reduced cost due to a decreased amount of liquid crystal used in the liquid crystal feeding process, and improvements in yield and ability in the sealing process for the liquid crystal inlet using UV-hardened resin after liquid crystal feeding.

As shown in FIG. 2, the liquid crystal display according to the present invention has been structured so that even on the side of liquid crystal inlet 14 with the end positions of two transparent substrates aligned, a plurality of transfers are provided outside of seal 24, as on other sides, and from each point of transfer, a wiring pattern of the same conducting members with those which form signal lines, crossing seal 24, is extended to connect, inside of seal 24, with an extended conductor prolonged along the direction of seal 24 on that side, and led to the side with signal line lead electrodes 18 provided, again crossing seal 24.

Employing this structure in which the end positions of two transparent substrates are aligned on the liquid crystal inlet side allows counter electrode potential (Vcom) to be applied to the transparent counter electrodes via a plurality of transfers located on the side of liquid crystal inlet 14 from peripheral circuit substrates provided outside of the side having signal line lead electrodes 18, thus the transparent counter electrodes driven uniformly, providing a large active matrix type liquid crystal display with better display quality and high definition.

DESCRIPTION OF THE PREFERRED EMBODIMENT

Figure 1:
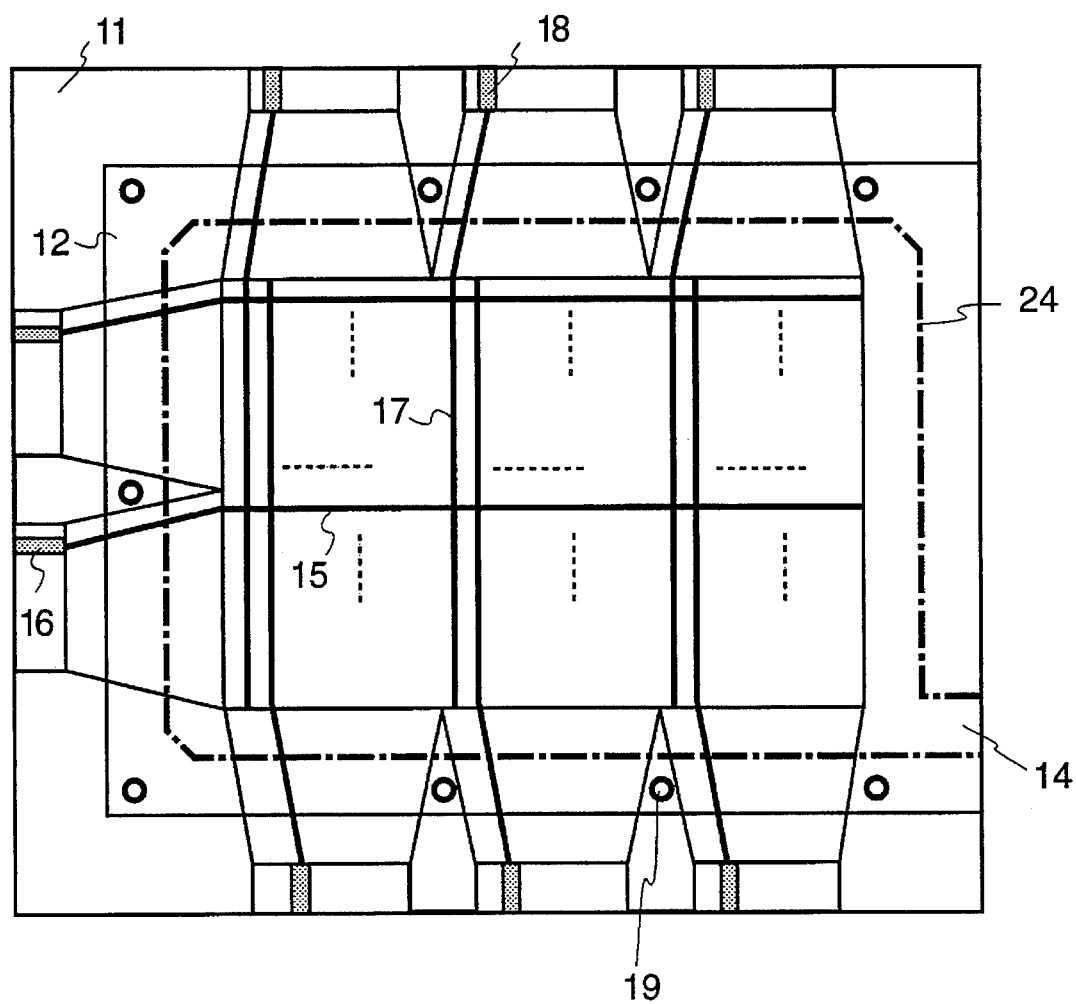
FIG. 1 is a top view of an active matrix type liquid crystal display having a conventional multiple transfer structure.
Figure 2:
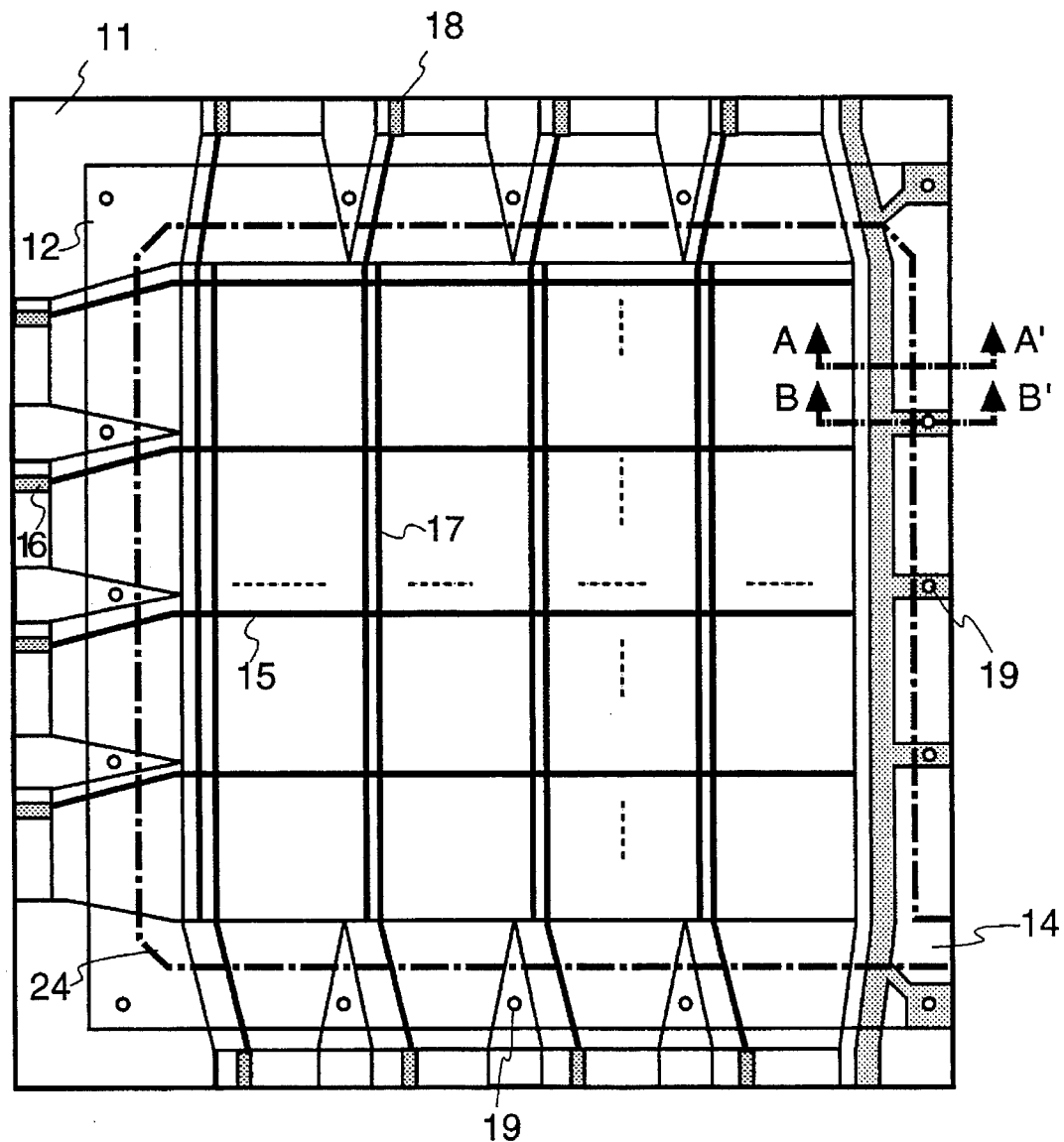
FIG. 2 is a top view, partly cut off, of an active matrix type liquid crystal display having a multiple transfer structure according to the present invention.

FIG. 2 is a top view of an active matrix type liquid crystal display which incorporates the present invention. Liquid crystal is sealed between active matrix substrate 11 and counter electrode substrate 12. Forming a vertical stripe arrangement, signal lines 17 are drawn alternately upward and downward to be connected to TABs (not shown) on which signal line driving LSIs are mounted, via signal line lead electrodes 18. Scan lines 15, having a large wiring pitch relative to signal lines 77, are drawn only toward one side to connect with TABs (not shown) on which scan line driving LSIs are mounted, via scan line lead electrodes 16. On the side opposing the one having scan line lead electrodes 16, liquid crystal inlet 14 is provided. Liquid crystal is sealed within an area surrounded by seal 24.

It is necessary to minimize the propagation delay of a modulation signal to counter electrode substrate 12 which has transparent counter electrodes 24 formed by transparent conducting film such as ITO, for modulating counter electrode potential (Vcom). This requires an increased number of transfers 19 to be provided for electrically connecting active matrix substrate 11 and counter electrode substrate 12.

The present invention is a structure having aligned end positions, on the liquid crystal inlet side, of two transparent substrates, and additional transfers provided on the liquid crystal inlet side, which, with this type of structure, have had no transfer because of space restrictions. As can be seen from FIG. 2, a number of transfers 19 is provided on the side of liquid crystal inlet 14 on the right.

On the side of liquid crystal inlet 14, a plurality of transfers 19 provided on the area without liquid crystal relative to seal 24, is connected by branched conductors formed so that it extends from extended conductor 21 provided on the area with liquid crystal relative to seal 24 to cross seal 24. Extended conductor 21 extends in parallel with seal 24 on the side of liquid crystal inlet, crosses again seal 24 on the side adjacent to the side of liquid crystal inlet 14, and connects to transfer lead electrode 20 on the side adjacent to the side of liquid crystal inlet 14.

In FIG. 2, extended conductor 21 is structured so that it connects the upper and lower sides of the display. However, the transfers on the liquid crystal inlet side may be connected by an extended conductor which is connected only with the transfer lead electrode either on the upper or lower side.

Figure 3:
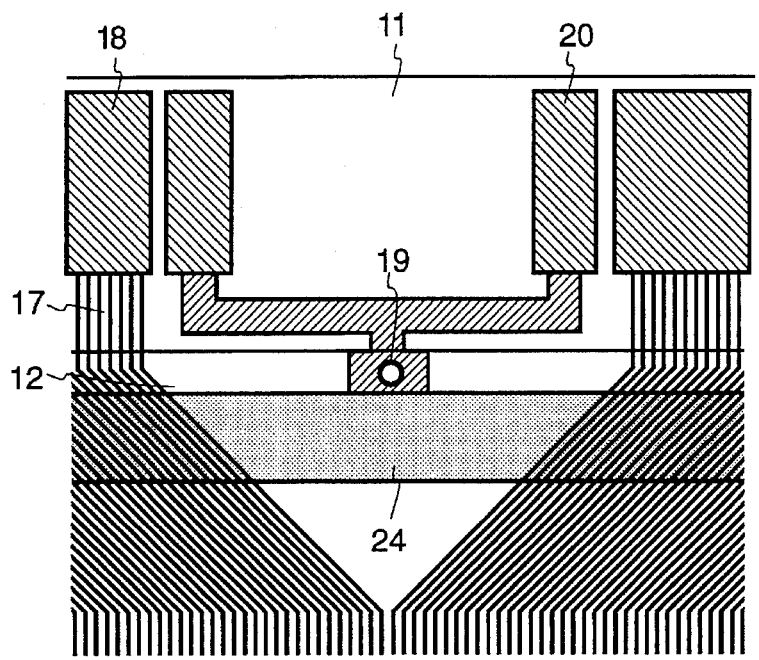
FIG. 3 is a partly enlarged view illustrating a transfer structure on the side adjacent to the liquid crystal inlet side of an active matrix type liquid crystal display having the multiple transfer structure according to the present invention.

FIG. 3 shows connections of a transfer and each electrode on the side adjacent to the one of liquid crystal inlet 14. Signal lines 17 are bundled for every output and each bundle is connected to corresponding signal line lead electrode 18. Transfer lead electrode 20 is located between signal line lead electrode 18, and transfer 19 is located outside of seal 24, i.e., on the side without liquid crystal. Counter electrode potential is applied from peripheral circuit substrates to the transparent counter electrode via transfer lead electrode 20 and transfer 19.

Figure 4:
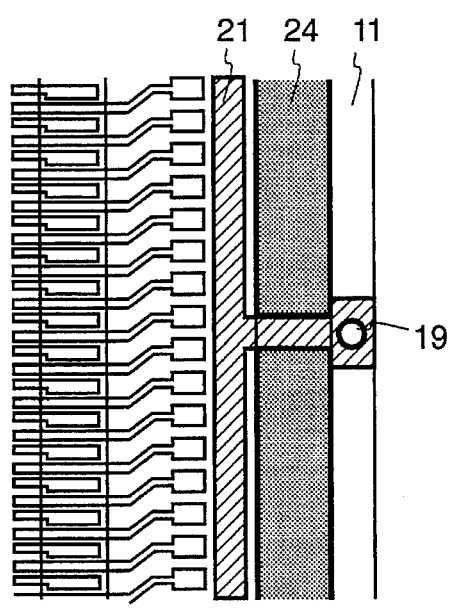
FIG. 4 is a partly enlarged view illustrating a transfer structure on the side of the liquid crystal inlet of an active matrix type liquid crystal display having the multiple transfer structure according to the present invention.

FIG. 4 shows transfer connections on the side of liquid crystal inlet 14. Transfer 19 is provided, similar to other sides, on the outside of seal 24, i.e., the side without liquid crystal. On the inner side of seal 24 where liquid crystal is provided, extended conductor 21 is formed. Transfer 19 and extended conductor 21 are connected by a branched conductor which extends from extended conductor 21 to join seal 24. On the outside of transfer 19, various electrodes are absent, thus requiring no substrates outside the structure of transfer 19, that is, eliminating outside extra substrate space to allow two transparent substrate end positions to be placed on the same plane.

Figure 5:
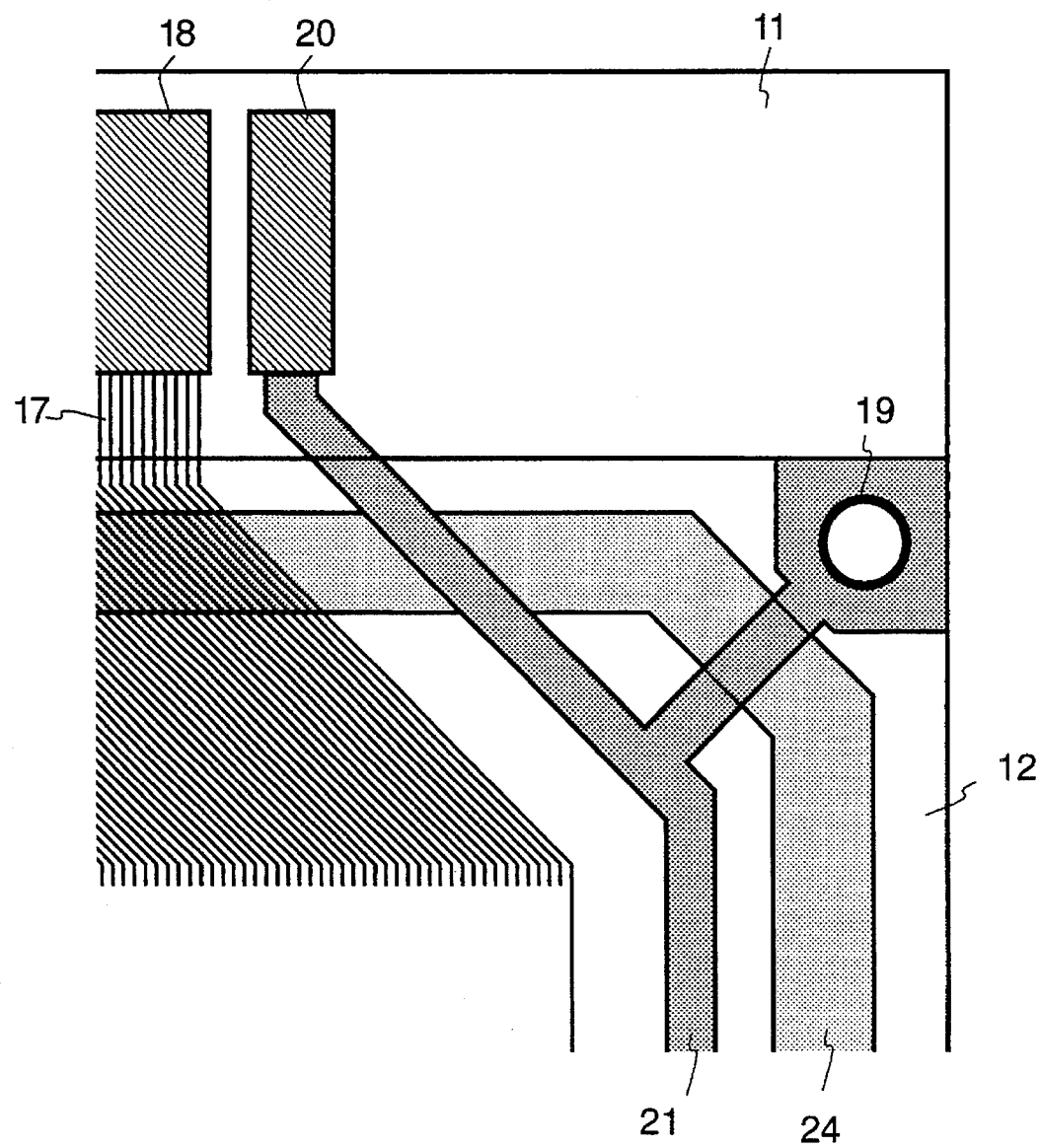
FIG. 5 is a partly enlarged view illustrating a transfer structure around the corner of the liquid crystal inlet side and its adjacent side of an active matrix type liquid crystal display having the multiple transfer structure according to the present invention.

FIG. 5 shows transfer arrangement around the corner of the side of liquid crystal inlet and its adjacent side. Transfer 19 is provided on top of counter electrode substrate 12 and connected with extended conductor 21 via a branched conductor which intersects seal 24. Extended conductor is connected to transfer lead electrode 20 formed on the side of signal line lead electrode 18. As can be seen from FIG. 5, active matrix substrate 11 has its end portion outside of counter electrode substrate 12 on the side of signal line lead electrode 18 with various electrodes formed, but the end faces of active matrix substrate 11 and counter electrode substrate 12 lie in substantially the same distance from seal 24 on the side of liquid crystal inlet without various electrodes (right side in FIG. 5).

In FIG. 5, though transfer 19 is provided on top of counter electrode substrate 12, the transfer may be located in any suitable position in relation to each electrode of the display, space, and other factors.

Figure 6:
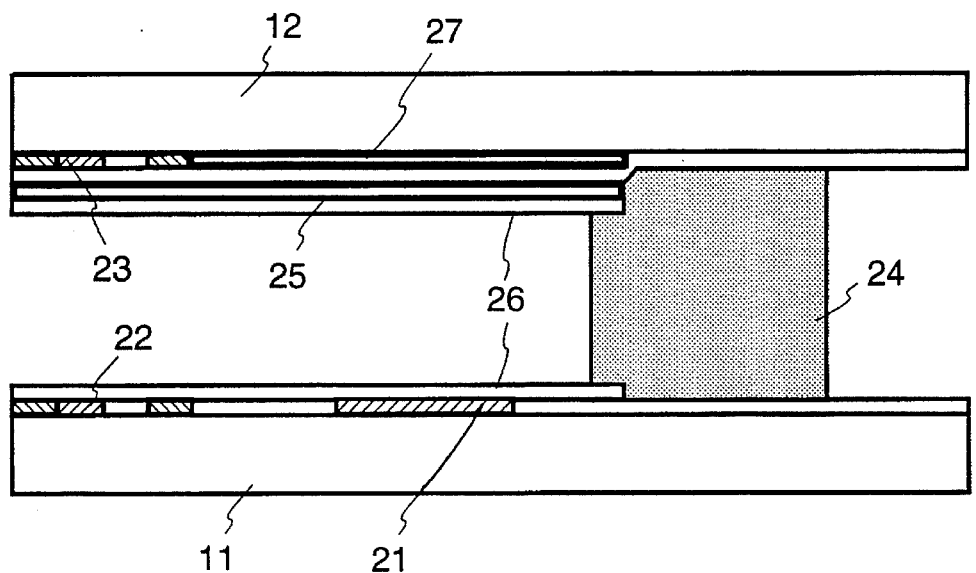
FIG. 6 is a cross section of line A—A' shown in FIG. 2 illustrating the active matrix type liquid crystal display having the multiple transfer structure of the present invention.

FIG. 6 shows a cross section of line A—A' in FIG. 2, i.e., the portion without transfer 19 on the side of liquid crystal inlet 14. This cross section is configured such that liquid crystal is sealed by seal 24 between upper counter electrode substrate 12 and lower active matrix substrate 11. Lower active matrix substrate 11 has pixels 22 and oriented film 26 formed of polyimide, for example, and upper counter electrode substrate 12 has color filters 23, oriented film 26, and black matrix 27. In counter electrode substrate 12, transparent counter electrode 25 is formed which is made of transparent conducting film such as ITO. Extended conductor 21 is provided inside of seal 24 on active matrix substrate 11.

Figure 7:
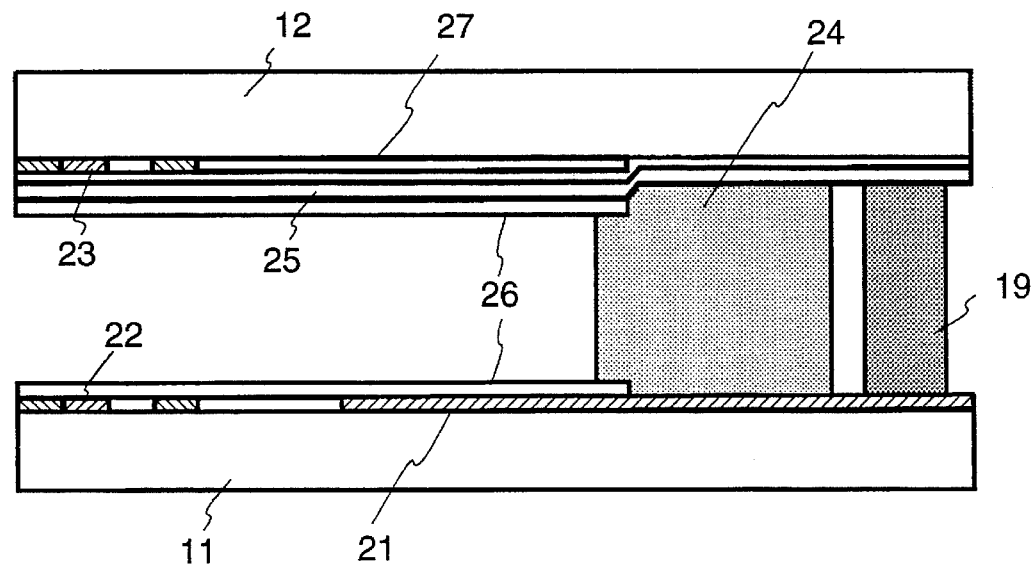
FIG. 7 is a cross section of line B—B' shown in FIG. 2 illustrating the active matrix type liquid crystal display having the multiple transfer structure of the present invention.

FIG. 7 shows a cross section of line B—B' in FIG. 2, i.e., the section of the portion where transfer 19 is provided on the side of liquid crystal inlet 14. Transfer 19, which comprises silver paste, for example, is configured to couple upper counter electrode substrate 12 and lower active matrix substrate 11 outside seal 24. Transparent counter electrode 25 of upper counter electrode substrate 12 is connected to transfer 19 from the upper side of seal 24. On the other hand, extended conductor 21 formed in lower active matrix substrate 11 is connected to transfer 19 from the lower side of seal 24. This arrangement has made it possible for counter electrode potential to be applied to transparent counter electrode 25 via extended conductor 21 and transfer 19, without requiring the formation of a connecting electrode from external substrates in the area of liquid crystal inlet 14.

As described above, in accordance with the present invention, it is possible, even on the side which has no space for liquid crystal display electrodes, to apply counter electrode potential through an extended conductor from an adjacent side, and to provide a large, high definition, and high quality liquid crystal display.

We claim:

1. A liquid crystal display having a first and a second transparent substrate with sealed liquid crystal therebetween, said first transparent substrate having a plurality of scan lines and a plurality of signal lines formed therein, said second transparent substrate having a transparent counter electrode formed therein, comprising:

transfer lead electrodes formed in said first transparent substrate at first, second and third sides of said liquid crystal display, for simultaneously applying counter electrode potential at each of said sides;

an extended conductor electrically connected to at least one of said transfer lead electrodes and extending along a fourth side of said liquid crystal display, said extended conductor being located inside of a liquid crystal seal; and a plurality of transfers at said first, second, third and fourth sides electrically connecting said transparent counter electrode to said transfer lead conductors, in order to allow counter electrode potential to be applied to said transparent counter electrode simultaneously at said first, second, third and fourth sides via said transfers, said transfers at said fourth side being located outside of said liquid crystal seal and being electrically connected to at least one of said transfer lead electrodes via said extended conductor, thereby not requiring additional transfer lead electrodes at said fourth side.

2. A liquid crystal display according to claim 1 in which said fourth side includes a liquid crystal inlet.

3. A liquid crystal display according to claim 1 in which said extended conductor is connected to said transfers at said fourth side via branched conductors provided to further extend said extended conductor so as to cross said liquid crystal seal.

4. A liquid crystal display according to claim 1 in which said extended conductor extends between two transfer lead electrodes on opposite sides of said liquid crystal display.

5. A liquid crystal display according to claim 1 in which said first and second transparent substrates both extend beyond said liquid crystal seal at said fourth side by substantially the same distance.

6. A liquid crystal display having a first and a second transparent substrate with sealed liquid crystal therebetween, said first transparent substrate having a plurality of scan lines and a plurality of signal lines formed therein, said second transparent substrate having a transparent counter electrode formed therein, comprising:

transfer lead electrodes formed in said first transparent substrate at first, second and third sides of said liquid crystal display, for simultaneously applying counter electrode potential at each of said sides;

an extended conductor electrically connected to at least one of said transfer lead electrodes and extending along a fourth side of said liquid crystal display; and a plurality of transfers at said first, second, third and fourth sides electrically connecting said transparent counter electrode to said transfer lead conductors, in order to allow counter electrode potential to be applied to said transparent counter electrode simultaneously at said first, second, third and fourth sides via said transfers, said transfers at said fourth side being electrically connected to at least one of said transfer lead electrodes via said extended conductor, thereby not requiring additional transfer lead electrodes at said fourth side, said transfers at said fourth side being located outside of a liquid crystal seal, said extended conductor being located inside of said liquid crystal seal, said extended conductor being connected to said transfers at said fourth side via branched conductors provided to further extend said extended conductor so as to cross said liquid crystal seal.

7. A liquid crystal display according to claim 6 in which said fourth side includes a liquid crystal inlet.

8. A liquid crystal display according to claim 6 in which said extended conductor extends between two transfer lead electrodes on opposite sides of said liquid crystal display.

9. A liquid crystal display according to claim 6 in which said first and second transparent substrates both extend beyond said liquid crystal seal at said fourth side by substantially the same distance.

\* \* \* \* \*